United States Patent [19]

Adams

[11] Patent Number: 4,571,236

[45] Date of Patent: Feb. 18, 1986

[54] CARTON SQUARING MECHANISM

[75] Inventor: Charles W. Adams, Walton, Ky.

[73] Assignee: R. A. Jones & Co. Inc., Covington, Ky.

[21] Appl. No.: 558,330

[22] Filed: Dec. 5, 1983

[51] Int. Cl.[4] ........................ B31B 3/78; B65G 15/10; B65G 19/02; B65G 49/00

[52] U.S. Cl. ...................................... 493/319; 53/566; 198/654; 198/726

[58] Field of Search .................. 493/319, 310; 53/566, 53/579; 198/654, 726

[56] References Cited

U.S. PATENT DOCUMENTS 3,016,808 1/1962 Galloway ............................ 53/566

FOREIGN PATENT DOCUMENTS 491828 1/1930 Fed. Rep. of Germany ...... 493/310

832346 4/1960 United Kingdom ................ 493/310

*Primary Examiner*—Lowell A. Larson

*Assistant Examiner*—William E. Terrell

*Attorney, Agent, or Firm*—Wood, Herron & Evans

[57] ABSTRACT

In a cartoner for filling and sealing tubular cartons wherein the cartons are carried between leading and trailing transport lugs, a mechanism for squaring the cartons consisting of inclining a leading lug in a rearward direction to engage a corner of a carton to hold the carton in an erect, squared attitude.

2 Claims, 1 Drawing Figure

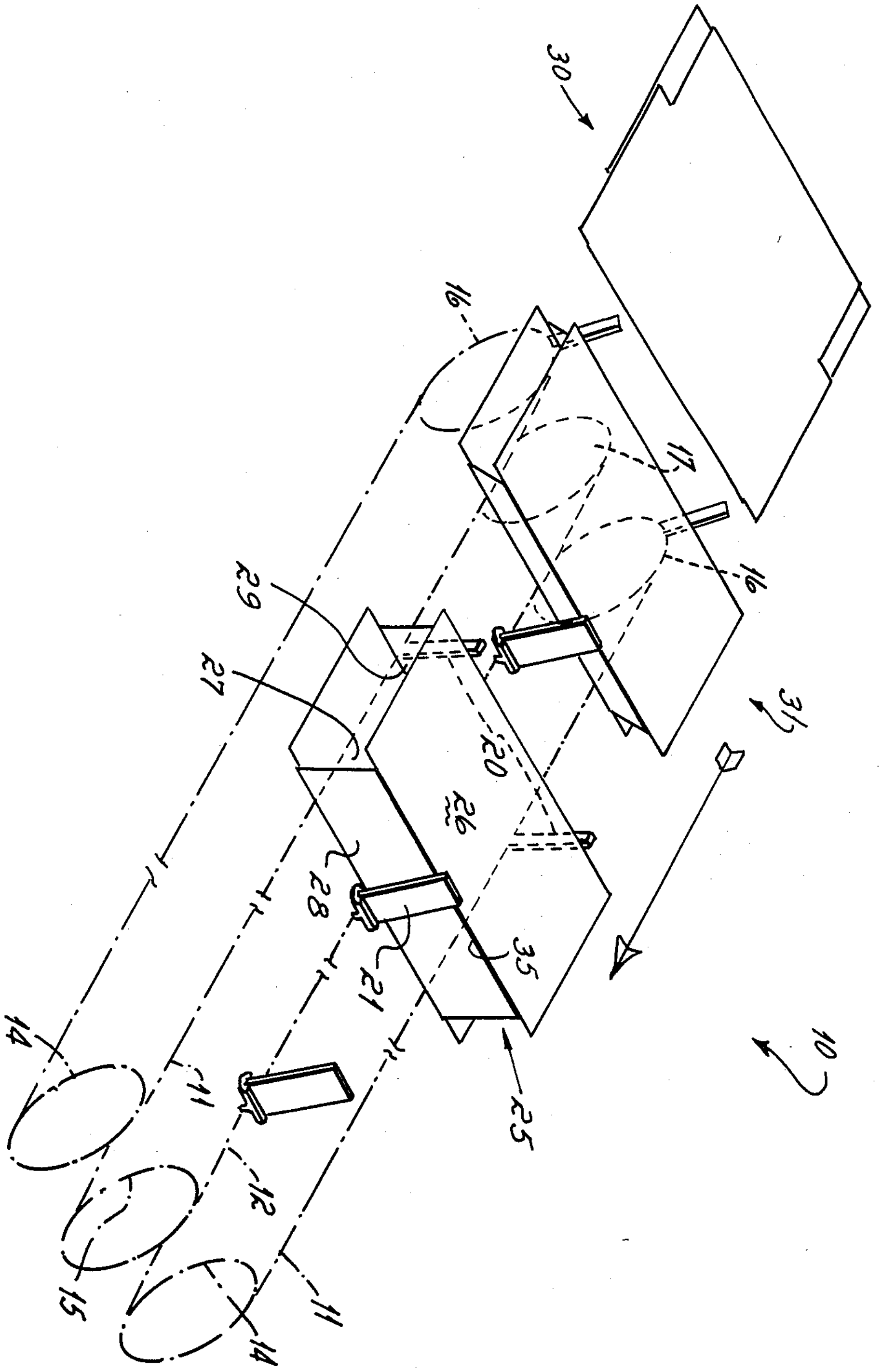
30
16
17
16
29
27
20
26
31
28
21
35
14
11
12
15
14
11
25
10

CARTON SQUARING MECHANISM

This invention relates to cartoning apparatus, and more particularly, to a mechanism for maintaining a carton square as it is carried through its filling and sealing operations.

In horizontal cartoning apparatus a carton is erected and captured between two trailing transport lugs on spaced parallel outboard chains and a leading transport lug on a center chain. The carton is held between those lugs as it passes through a filling station wherein a barrel loader thrusts product into the carton and as it passes through gluing and flap closing apparatus wherein the carton is sealed. If a carton, as it is transported through the sealing stages, is not square, the flaps are misaligned on the resultant package making an unsightly and hence unacceptable package.

The present invention deals with a conventional tubular carton having, in the horizontal attitude, a top wall, a bottom wall and leading and trailing side walls. A leading wall faces downwardly when the carton is in a flat folded condition and projects in a forward direction as the carton is being erected. The "fight" of the board from which the carton is made tends to resiliently urge the side walls to a forwardly-inclined attitude in which the leading wall would face in a downward direction.

A number of different approaches have been attempted to maintain the carton in a squared attitude in which the corners are at right angles. These include mechanisms which erect the carton beyond a vertical attitude so as to take some of the fight out of the board. Also, brushes and a top rail have been provided to frictionally engage the top wall of the carton to urge it to a vertical attitude. A considerable amount of operator skill has been required to do the job well and to keep the cartons squared throughout a shift.

The objective of the present invention is to improve the cartoner mechanism by providing mechanism for maintaining the carton in a squared attitude with substantially no reliance on operator skill.

This objective of the invention has been attained by inclining all of the leading lugs at a slight angle from a vertical attitude in a rearward direction. The rearwardly-inclined leading lugs will engage the upper leading corner of the carton. The center chain carrying the leading lugs is easily adjusted longitudinally with respect to the chains carrying the trailing lugs so that the spacing of the lugs can be altered until the cartons carried between the lugs are continuously maintained in a squared attitude through the processing.

The objective and features of the invention will become more readily apparent from the following detailed description taken in conjunction with the accompanying drawing which is a diagrammatic perspective view of the transport conveyor embodying the invention.

Referring to the drawing, the transport conveyor is shown at 10. It includes two outboard endless chains 11 and a center endless chain 12. The chains pass over driving sprockets 14, 15 at the forward end and idler sprockets 16, 17 at the trailing end. The outboard chains 11 carry a series of uniformly-spaced trailing lugs 20. The center chain carries a series of uniformly-spaced leading lugs 21.

A carton 25 is shown captured between the trailing lugs 20 and a leading lug 21. The carton has a top wall 26, bottom wall 27, a leading side wall 28, and trailing side wall 29. The carton in a flat folded condition is shown at 30 at the left in the drawing before being placed between the transport lugs. In one form of cartoner, the carton is erected by blasts of air at its ends. During the process of erecting it, it passes through the attitude shown at 31. When a carton is in the erect condition as shown at 25, there is a tendency because of the resilience or "fight" of the board to assume the attitude indicated at 31. If both leading and trailing lugs are upright, it is not possible, using lugs alone, to maintain the carton corners perfectly squared. There is always some tendency for the carton to lean forward toward the attitude indicated at 31. In accordance with the invention therefore, the leading lugs on the center chain are inclined rearwardly approximately 5°. In this attitude, the lugs will engage the upper corner, indicated at 35, of the carton to force the carton into a square attitude where the corners are at right angles. The center chain can be shifted by the operator, with cartons in place, until the operator can see that the positioning is exactly right in order to maintain the cartons in the squared attitude. Once set, there is no need for further adjustment throughout the run. The only need for adjustment would arise as the chains wear and stretch, but the new adjustment is quite simply made.

Having described my invention, I claim:

1. In a cartoner having a transport conveyor, the transport conveyor comprising opposed pairs of laterally spaced sprockets, spaced parallel endless chains passing around respective pairs of opposed sprockets, each conveyor chain having an upper horizontal run and carrying spaced upwardly-projecting trailing transport lugs, opposed center sprockets disposed between said laterally spaced sprockets and a center endless chain passing around said center sprockets and having an upper horizontal run, said center chain carrying a series of spaced upwardly-projecting leading transport lugs, said center chain being longitudinally adjustable to vary the spacing between the trailing and leading lugs, means for squaring a carton deposited between said leading and trailing lugs, said carton in its flat folded condition having a downwardly-facing leading side wall, said squaring means comprising means for maintaining each said leading lug in a rearwardly-inclined attitude and said trailing lugs in a vertical attitude when on said upper run wherein said leading lug engages the upper corner of said carton between said leading side wall and an upper wall to urge and maintain said carton corners to a right angle attitude.

2. In a cartoner as in claim 1, said leading lugs are inclined at about 5° to vertical.

* * * * *